(12) United States Patent
Dowrick (10) Patent No.: US 7,001,183 B2
(45) Date of Patent: Feb. 21, 2006

(54) DIAGNOSTICALLY AND AUDIBLY RESPONSIVE COMPUTER LEARNING MEMORY GAME AND SYSTEM PROVIDED THEREFOR

(76) Inventor: Peter Dowrick, 45-032 Lilipuna Rd., Kaneohe, HI (US) 96744

( * ) Notice: Subject to any disclaimer, the term of this patent is extended or adjusted under 35 U.S.C. 154(b) by 10 days.

(21) Appl. No.: 10/455,152

(22) Filed: Jun. 5, 2003

(65) Prior Publication Data
US 2004/0002043 A1 Jan. 1, 2004

Related U.S. Application Data

(60) Provisional application No. 60/387,759, filed on Jun. 10, 2002.

(51) Int. Cl.
*G09B 17/00* (2006.01)
(52) U.S. Cl. ..................................... 434/178
(58) Field of Classification Search ........ 434/178–183, 434/308, 319–320, 322, 327, 333, 343–344, 434/348; 463/9, 31, 35
See application file for complete search history.

(56) References Cited

U.S. PATENT DOCUMENTS

| | | | |
|---|---|---|---|
| 4,435,902 A | 3/1984 | Mercer et al. ................. 30/296 |
| 4,661,074 A | 4/1987 | Walker ........................ 434/178 |
| 4,955,614 A | 9/1990 | Buda ........................... 273/240 |
| 5,213,333 A | 5/1993 | Petrovich et al. ............. 273/243 |
| 5,630,754 A * | 5/1997 | Rebane ........................... 463/9 |
| 5,788,503 A | 8/1998 | Shapiro et al. ............... 434/172 |
| 5,920,838 A | 7/1999 | Mostow et al. ............... 704/255 |
| 6,206,700 B1 | 3/2001 | Brown et al. ................. 434/116 |
| 6,419,231 B1 | 7/2002 | Rivera ......................... 273/271 |
| 2003/0003427 A1 | 1/2003 | Wood et al. .................. 435/174 |

OTHER PUBLICATIONS http://www.playandlearn.org/home.asp , prior to 2002 5 pages.
http://sciencenorth.on.ca/learn/coolscience/coolwebstuff/concentration , prior to 2002 3 pages.
http://www.chandra.harvard,edu/edu/games/concentration/game4/index.html , prior to 2002 4 pages.
International Search Report for PCT/US03/18109 of Applicant herein dated Mar. 15, 2003.

* cited by examiner

*Primary Examiner*—Kim Nguyen
(74) *Attorney, Agent, or Firm*—Alfred M. Walker (57) ABSTRACT

A diagnostically and audibly responsive computer learning memory game works with small children and other persons in teaching them to read. Square or rectangular tiles to be uncovered are displayed upside down, concealing words to be matched with words or words to be matched with phrases or visual pictures or audible sounds, objective is to find matching cards. The computer game matches the cards or tiles with sight words that the user is learning to read from a word list. The user must remember where a correct word of the word pairs is located. The user must read word orally, if not, the computer will prompt the user with a clue (such as the beginning sound of a word) until the user answers. If nothing is heard, the user is told the answer. The system has a built-in recording of a library of selected words, phrases, pictures or audible sounds. The computer can sense that user is silent (with a default of no sound). If a wrong word is uttered, the system can remain silent or correct the user.

12 Claims, 11 Drawing Sheets

Memory Cards Flow Chart, Layer 1.1

DIAGNOSTICALLY AND AUDIBLY RESPONSIVE COMPUTER LEARNING MEMORY GAME AND SYSTEM PROVIDED THEREFOR

RELATED APPLICATIONS

This application claims the benefit under 35 USC 119(e) of provisional patent application Ser. No. 60/387,759 of Jun. 10, 2002.

FIELD OF THE INVENTION

The present invention relates to a computerized learning game which teaches according to the verbal input of the users; with automated coaching administered along with memory matching technique to encourage the user to not only recall the learned matter but also to identify its relative position in order to teach the subject matter effectively.

BACKGROUND OF THE INVENTION

Among related patents include U.S. Pat. Nos. 5,920,838 of Mostow and 6,206,700 of Brown.

The Brown '700 patent is important because it has a comprehensive set of flow charts which describe its reading system, including actual views of computer screens, where examples such as a picture of an elephant are accompanied by a phrase such as "Watch the elephant". The Brown '700 patent does not describe a system of pairing words by elimination of paired covered blocks until a pair of identical words is revealed, as in the television game of "CONCENTRATION".

U.S. Pat. No. 4,955,614 of Buda discloses a game of word forming by elimination, although not by eliminating successive pairs of block covers as in the present invention. U.S. Pat. No. 4,435,902 of Hengel discloses a word game using images on physical cards. U.S. Pat. No. 4,661,074 of Walker discloses a card game and U.S. Pat. No. 5,213,333 of Petrovich discloses a word association game with lists of words.

While these above noted patents do not clearly disclose the present invention of pairing words by elimination of paired covered blocks until a pair of identical words is revealed, as in the television game of "CONCENTRATION", but non-patented websites do show the use of a CONCENTRATION type of game.

For example, there are non-patented educational games which explicitly describe a system of pairing words by elimination of paired covered blocks until a pair of identical words is revealed, as in the television game of "CONCENTRATION." For example, in one if one go to the website playandlearn.org one will find a CONCENTRATION type game which uses pairs of tile cards on a computer screen which are flipped until the student obtains a match, as in the present Memory Cards game. Each match reveals a portion of the screen which ultimately shows a full picture, instead of the present blank grid after all the pairs of words have been matched. Another similar CONCENTRATION type game is found at sciencenorth.on.ca/learn/coolschience/coolwebstuff/concentration in which pairs of blocks are uncovered by successfully matching the image pairs underneath the covered blocks to reveal words in a science learning game.

Moreover, in a third CONCENTRATION type game found on the Internet is found at chandra.harvard.edu/edu/games/concentration in astronomy, wherein pairs of covered blocks are sequentially flipped to reveal paired words.

However, neither the matching memory games discussed above nor elimination games describe the present multimedia learning system which utilizes the verbal input from the user to perform diagnostics and evaluate their proficiency along with interactive directed coaching based on the analysis of the user's input, which exponentially enhances the efficiency and comprehensiveness of the instruction.

OBJECTS OF THE INVENTION

It is therefore an object of the present invention to provide a multimedia teaching system to assist educators and other institutions in providing additional tutelage to both young students and adults which require attention. Further this system may be utilized to provide a vehicle for students of all ages to unilaterally learn new materials.

It is also an object of the present invention to provide an interactive system that mimics the teaching relationship between a human teacher and student. According the computerized diagnostics and analysis of the user input is essential to identify the necessary and particular responses of the user. Finally the system evaluates the overall competency and aptitude of the user.

Other objects of the present invention will become apparent from the following description of the present invention.

SUMMARY OF THE INVENTION

In keeping with these objects and others which may become apparent, the present invention is an educational computer game and system for working with readers, such as small children, adolescents or adults in teaching them to learn skills, such as, for example, to read or comprehend other sensory perceptible learning material, including text, images, sounds and tactilly perceptible subject matter, such as objects.

Based upon the pre-existing game of CONCENTRATION, the system includes a computer version of a grid with a set of tiles or cards which are upside down and the objective is to find matching tiles or cards. The computer game matches hidden correct answers on upside down placed tiles but with sight words that student is learning to read from word list.

For example, the computer will display 16 square or rectangular tiles on a video display screen, where each hides a word of pairs of words. The computer gradually reduces the number of tiles or cards (squares or rectangles) so that the user can remember where the correct word of pairs is. The user must read a word orally i.e. the word may be "hour" if the user doesn't, the computer uses speech recognition software to interpret the user's answer or lack thereof, to then audibly or visually prompt the user with an audibly and/or visually perceptible clue (a "beginning sound or image") until the user answers. If the user says nothing, the user is audibly told the answer. The game is completed once all tiles are removed from the screen. In order to remove the tiles, the user must identify the position of the matching tiles and correctly verbalize the words under both tiles.

The system has a built-in recording of words. The present invention senses that user is silent (through recognizing by default no sound). If a wrong word is said, the system can be silent or can correct the user. It can be used to match two words of different languages. The system can also be used to identify medical or botanical terms with an interactive grid, such as a picture of plant to be stated as an identifiable word)

The system may also utilize pictures to elicit a verbal response from the user. The user can pick a certain tile which reveals the image of the object to be identified verbally. Further, a tile may be matched with a word by a spoken phrase of the user.

The system also utilizes a database to store all input received from all users. The system can conduct an analysis of the data can be to determine measured characteristics of the user. User measured characteristics may include but are not limited to: latency of response to a particular subject, type of accuracy, type of errors, task proficiency, working memory, subject strengths, subject weaknesses, educational grade levels, and intelligence.

The system may also have a predefined benchmark in which the administrator of the system can specify as the criteria. The system can gauge the user based on the predetermined benchmark or based on the population data gathered from previous users. The system may also use known and accepted psychological techniques to analyze the user based on their inputs.

The multimedia environment of the present invention enhances unilateral education of users by incorporating speech and sound recognition. The addition of speech recognition to the present invention greatly enhances the ability for the user to grasp new material.

The use of a computer algorithm, such as neural network, provides the system with the ability to gage and analyze the user's ability to aid the administrator to determine if the user requires additional assistance, a different type of assistance, an escalation of educational concern, or the termination of assistance. The important interactive function of the present invention is maintained with the multimedia and computer analysis feature. The synergistic combination of the of the matching memory game with the unique multimedia analysis ability provide beneficial results that are not possible with any other type of educational tools as effectively.

In a preferred embodiment, the present invention includes but is not limited to, at least one: central processing unit, display panel, microphone, speakers, media storage, internet capability, mouse, and keyboard.

BRIEF DESCRIPTION OF THE DRAWINGS

The present invention can best be understood in connection with the accompanying drawings. It is noted that the invention is not limited to the precise embodiments shown in drawings, in which.

DETAILED DESCRIPTION OF THE INVENTION

The present invention has broad applications to many technical fields for a variety of articles. For illustrative purposes-only, a preferred mode for carrying out the invention is described herein, wherein a multimedia computer utilizes speech recognition in order to teach and evaluate user in the format of a memory matching game.

The method of playing a multimedia computer learning game includes the steps of:
  providing a predetermined matrix of covered tiles;
  allowing a user to select a tile;
  turning over the selected tile to reveal a subject to be learned;
  user speaking the subject of the tile;
  evaluating vocal input of the user;
  marking correct user input with individual tiles;
  removing correct matched pairs of tiles; and
  reading all learned material to the user.

The evaluation includes a number of tasks, such as determining user strengths, user educational grade levels, user intelligence, user weaknesses, persistent errors of users and/or user proficiency.

The evaluation is utilized for screening users.

When the user unsuccessfully attempting the learned subject, the game provides verbal clues to the user, and may vocalize the clues or the answers in the user's own prerecorded voice or in a digitized computer voice for revealing answers in response to the user's predetermined incorrect vocal responses. Other user perceptible responses other than voice may be employed, such recognizable visual images, text, script or tactile sensory input.

Figure 1:
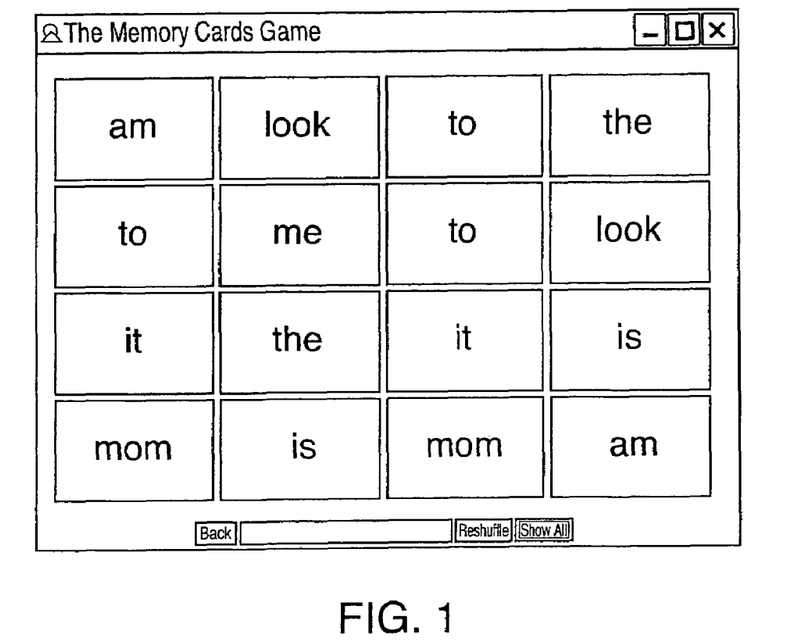
FIG. 1 is a frontal view of the display screen with the tile matrix revealing the subject to be learned in the present invention.

FIG. 1 is a frontal view of the display screen with the tile matrix revealing the subject to be learned, as an example can be vocabulary words. Each tile contains the particular subject matter to be learned by the user. The subject matter is usually presented in pairs. The tiles may be shuffled in any random order and presented to the user in a matrix of covered tiles. The object of the game is not only for the user to match the subject matter under the tiles but also to give the correct verbal response associated to the particular subject matter.

Figure 2:
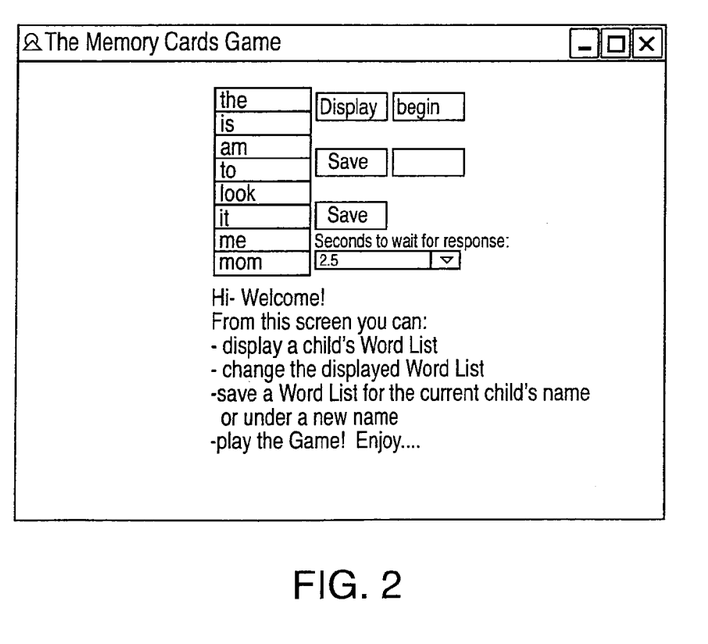
FIG. 2 is a frontal view of the display screen which allows the user or the administrator to select the particular subject matter to be learned in the present invention.

FIG. 2 is a frontal view of the display screen which allows the user or the administrator to select the particular subject matter to be learned in the present invention. This particular screen allows the administrator, teacher, player or user to select the words or other types of subject matter to be learned. At this screen the administrator or user can recall the particular user's previously saved file. This particular screen can also allow new users to be created in the system.

Figure 3:
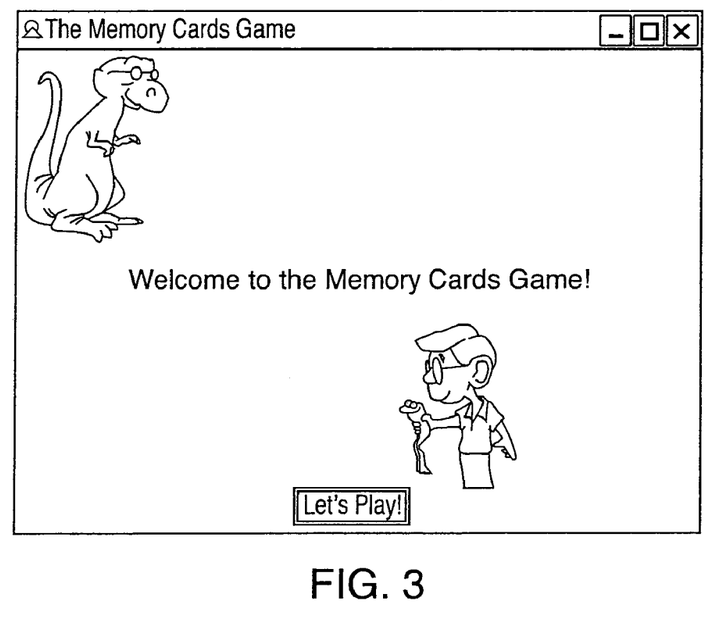
FIG. 3 is a frontal view of the user introduction screen in the present invention.

FIG. 3 is a frontal view of the user introduction screen in the present invention. This is the initial screen the user views before playing the game. This screen should display aesthetically pleasing representations to the user in order to place the user in a comfortable and relaxed state.

Figure 4:
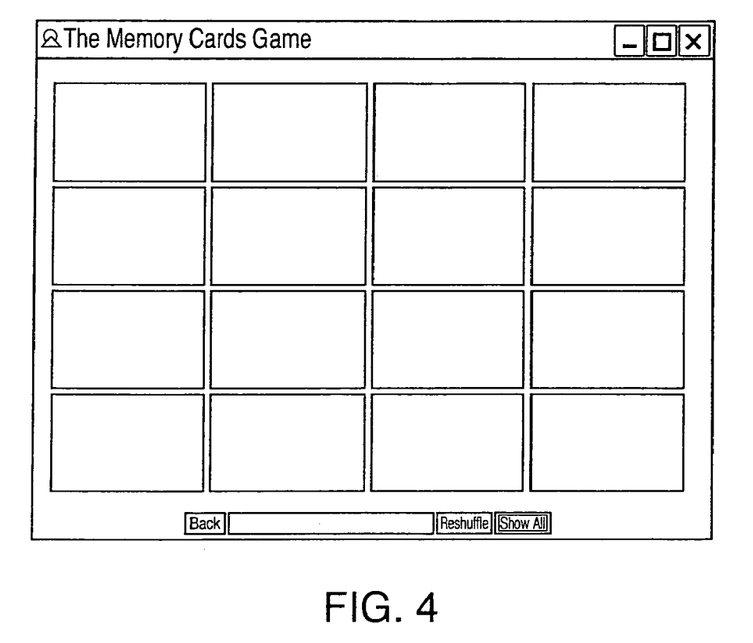
FIG. 4 is a frontal view of the display screen showing all the tiles being covered in the present invention.

FIG. 4 is a frontal view of the display screen showing all the tiles being covered in the present invention. This is a representation of the initial screen views once the game has begun. The matrix is completely occupied with covered tiles. The user can then select an individual tile. Once the tile is selected, it is uncovered to reveal the subject matter to be learned. The user must then verbalize the subject matter correctly. Once the user has uttered the correct answer, he can then attempt to find the matching tile. If tiles do not match or the user uttered the incorrect response, the tiles are covered once again.

Figure 5:
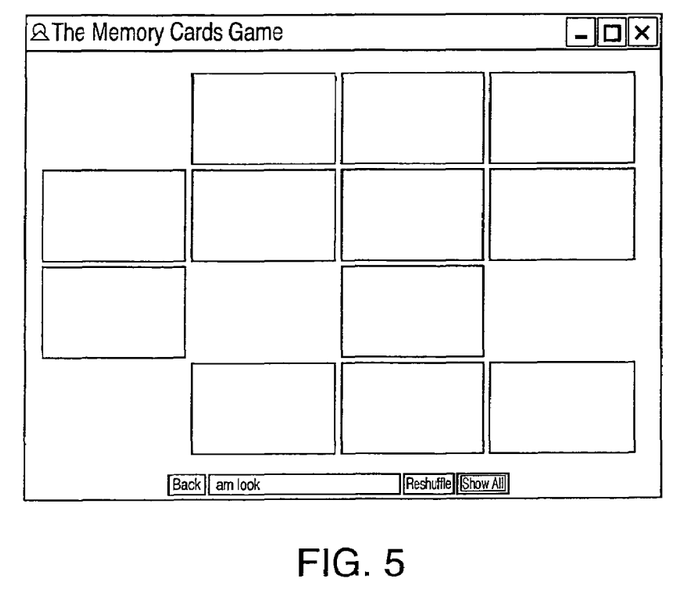
FIG. 5 is a frontal view of the display screen showing the tile removal after correct user input and matching in the present invention.

FIG. 5 is a frontal view of the display screen showing the tile removal after correct user input and matching in the present invention. This screen is a representation of the progression of the game. Once the user uncovers the matching tiles with the correct responses, they are removed from the matrix. The user wins the game by eliminating all of the tiles. Once the screen is empty then the game is complete.

Figure 6:
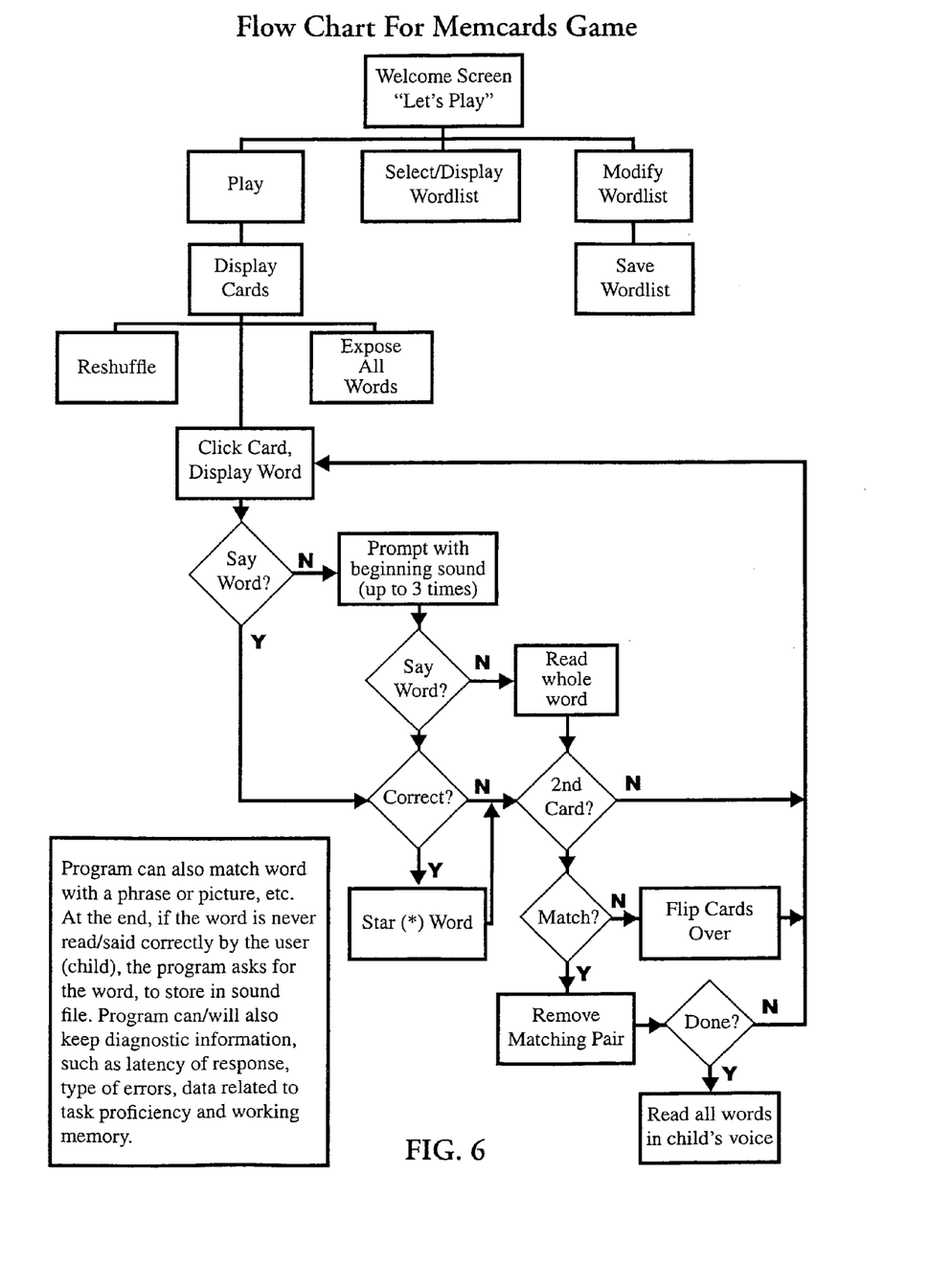
FIG. 6 is a flowchart describing the overview of the present invention.

FIG. 6 is a flowchart describing the overview of the present invention. The system begins with the initial welcome screen. At this point the user or administrator has the ability to select the words to be presented under the tiles. Further, new words can be added to the system and save for later use. After the subject matter has been selected for this particular session the game can begin. The user selects the button labeled play to begin the game. The system then displays the matrix of the covered tiles to the user. At this point the matrix is filled with covered tiles. The user then has the option to request the system to expose all the words under the tiles in the matrix; to enhance the difficulty of the game the user can request to have the tiles shuffled.

The user starts the game by selecting a particular tile. Once the tile is selected, the word beneath the tile is revealed. The user must now give the correct vocalize the word uncovered. If the user gives an incorrect response the system allows the user to retry the word for a predetermined number of attempts. If the user fails all attempts to give the correct response the system can vocalize the correct answer in a digitalized computer simulated voice or in the user's own prerecorded voice. Alternatively, after each iteration of the user, the system is able to coach the user to a lesser or greater extent depending on the number of tries. All of this user data is recorded into the users own file in order to perform diagnostics of the user's performance. If the user fails to ultimately give the correct response, the tile is again covered and there is no option to try to find the corresponding matching tile.

If the user gives the correct response, the tile is tagged and remains uncovered. The user now has the opportunity to locate matching covered tile. Initial attempts are based on luck, but as the game progresses, the user has an opportunity to uncover and locate the identity of the covered tiles. Not only is the user required to reiterate the response correctly twice but to remember the location of corresponding tiles. Once matching tiles are located and given the correct response, they are removed from the matrix. The game is finished when the matrix is empty, without any tiles. Once the game is complete the system can reiterate all the words in the child's or adult's own prerecorded voice.

Figure 7:
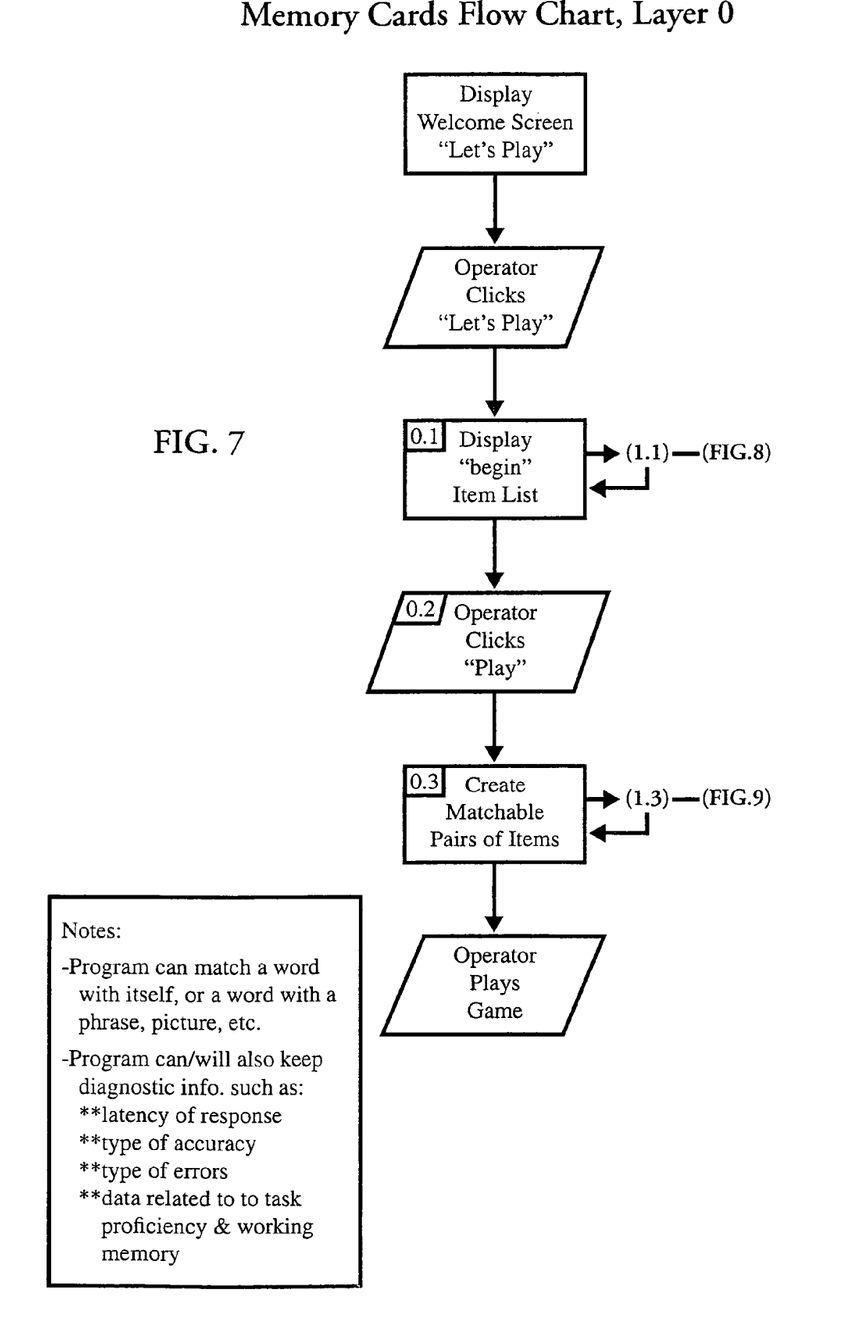
FIG. 7 is a flowchart of the introductory stages of the learning system of the present invention.

FIG. 7 is a flowchart of the introductory stages of the learning system of the present invention. Each block represents steps the user takes to initiate a new game session.

Figure 8:
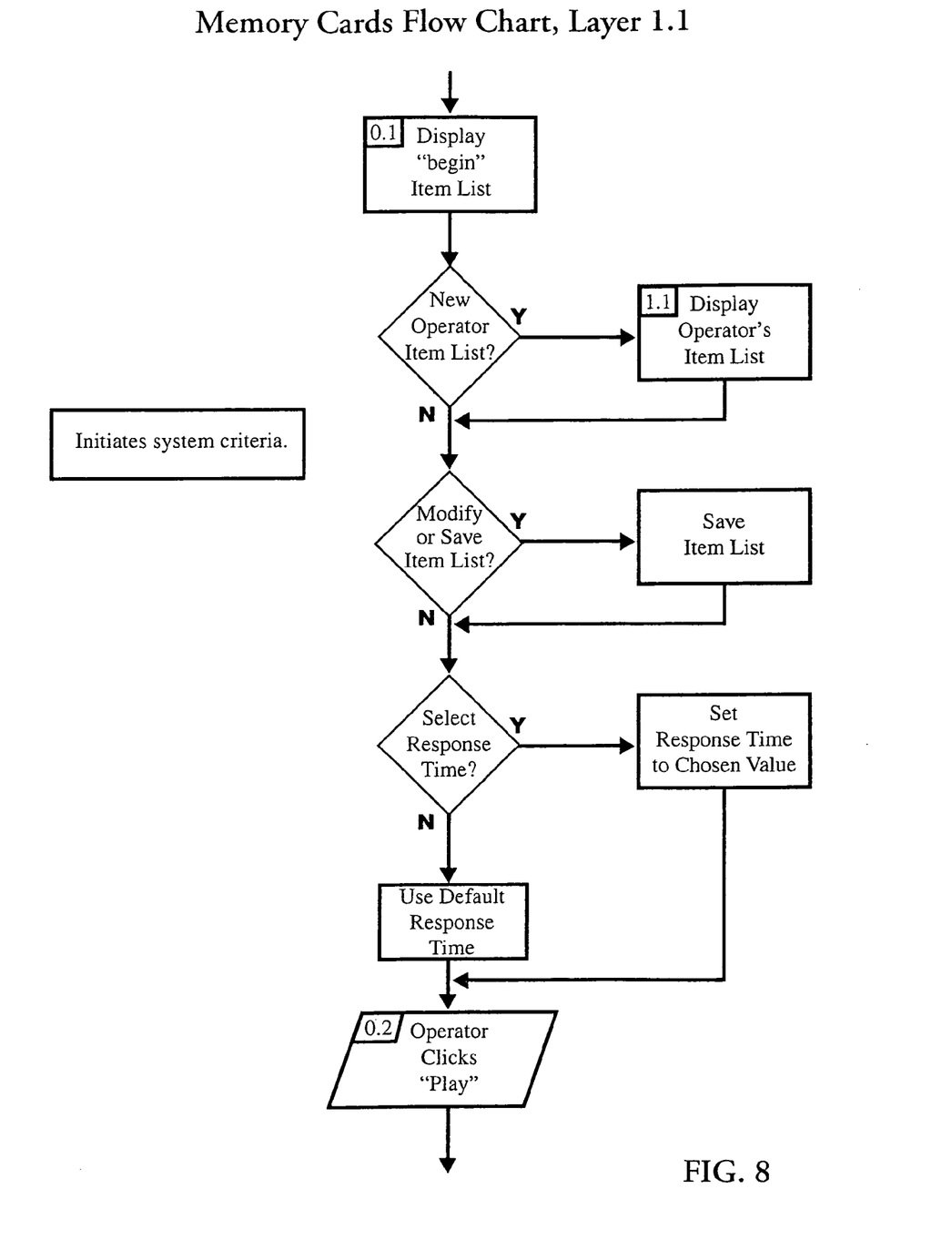
FIG. 8 is a flowchart of the learned subject matter selection stage of the present invention.

FIG. 8 is a flowchart of the learned subject matter selection stage of the present invention. At this stage the user or administrator is able to adjust the criteria of the game. The list of material to be learned can be changed at this point or added to. Further, a limit on the response user time can be initiated at this point.

Figure 9:
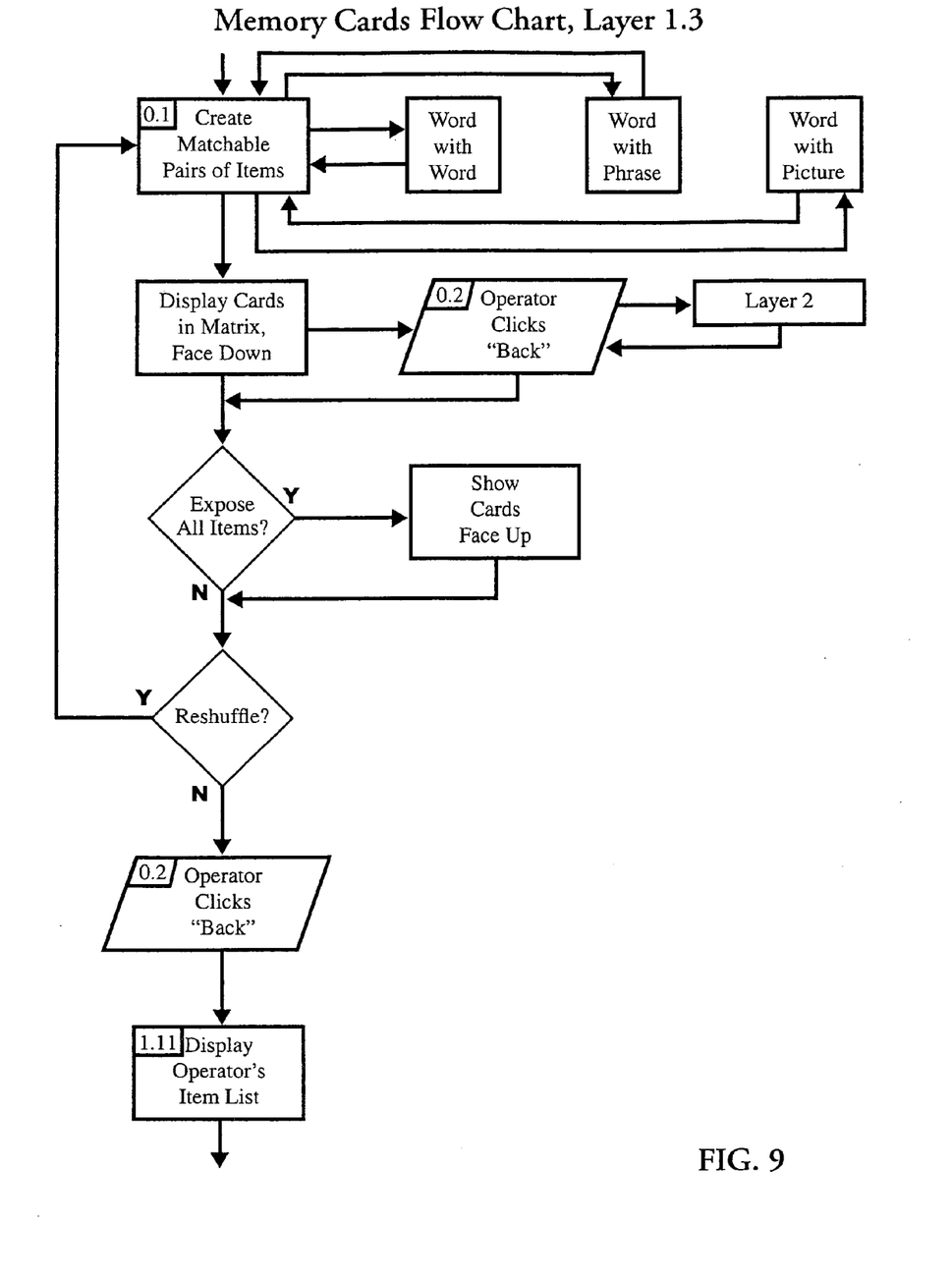
FIG. 9 is a flowchart of the system arranging the subject matter to be learned in a matrix format.

FIG. 9 is a flowchart of the system arranging the subject matter to be learned in a matrix format. To begin the game the system generates a matching word list based on the initial criteria set at the selection stage. All tiles presented to the user in the matrix are covered. At this point the user is able to reduce the difficultly of the game by choosing to reveal all words associated to each tile. This enables the user to obtain knowledge of the location of the matching words, thus allowing the game to be initially left to chance. Once all tiles are revealed and the user can choose to increase difficulty, by shuffling the tiles once again in a random order. After this is done the tiles are again presented a covered state. At this point the user may select any tile to begin the game.

Figure 10:
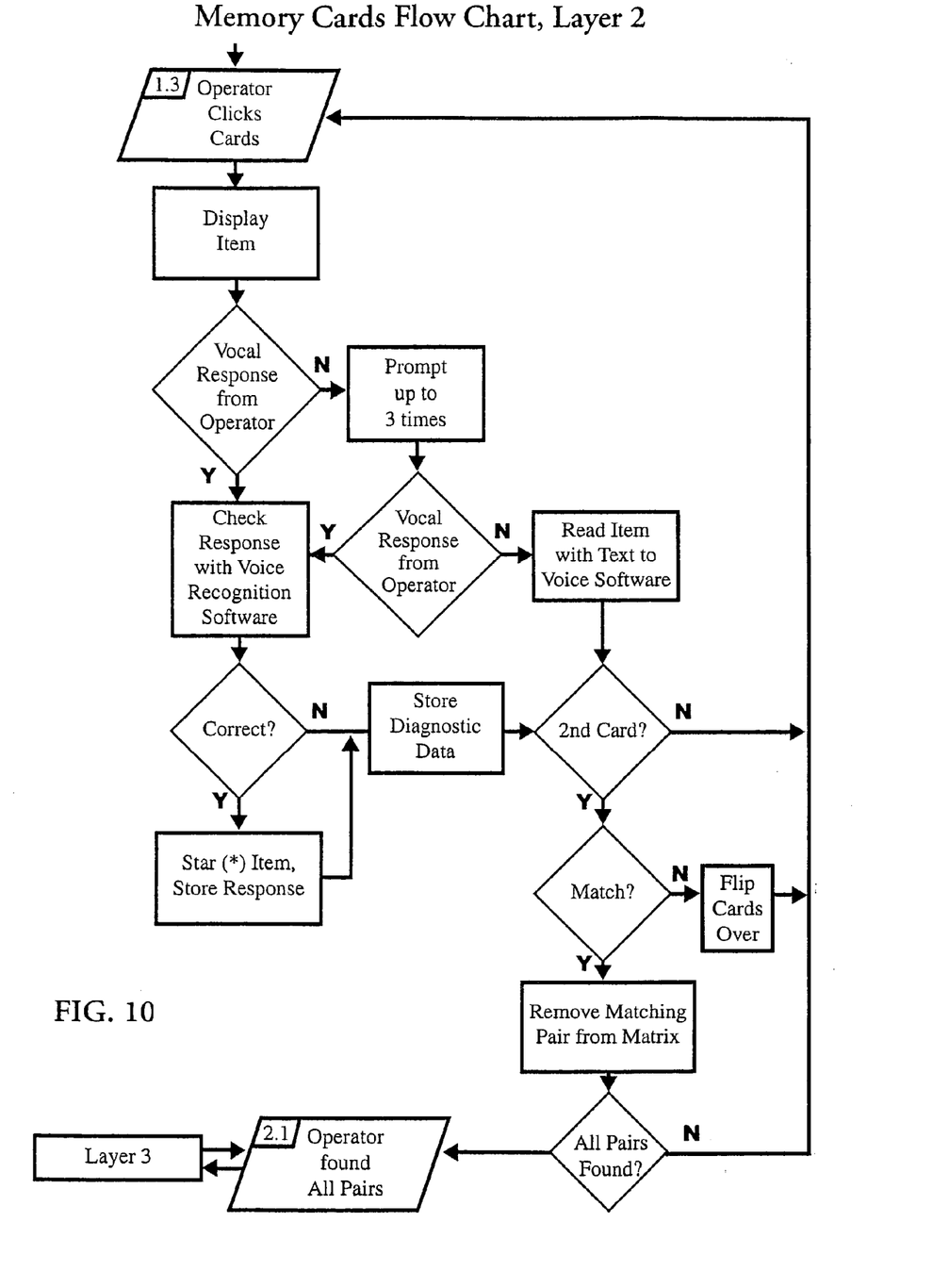
FIG. 10 is a flowchart of the user playing the game in the present invention.
Figure 11:
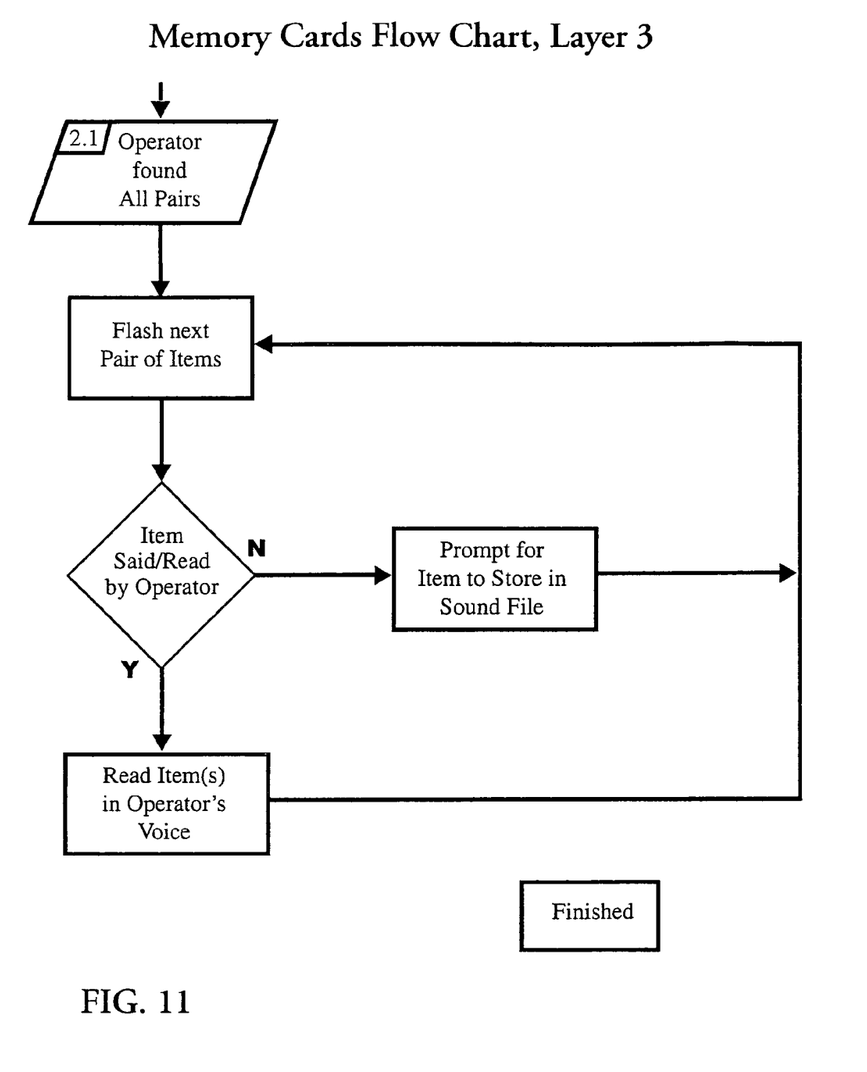
FIG. 11 is a flowchart of the end of the game in the present invention.

FIG. 10 is a flowchart of the user playing the game in the present invention. Once the user selects a tile, the word associated with the tile is displayed. The system now awaits a verbal or other sensory perceptible response from the user. Now the user is able to make verbal attempts at the word. The system can be configured to accept the spoken word as a correct response. It may also accept the vocalization of a phrase associated to the word presented under the tile as a correct response. Further the tiles may display pictures to invoke the correct verbal response from the user. If the user makes the predetermined number of incorrect attempts the system reads the word to the user.

The response from the user can be a correct vocalization of the word, a partial vocalization, or a wrong vocalization. The system conducts diagnostics of this input information. Based on the diagnostics the system can choose to coach the user with the determined method. Each iterative attempt by the user can prompt the system to sound more of the word out to the user. Further the diagnostics of the current session can be compared to this particular user's file to determine problem areas, improvement, rate of improvement, as well as educational proficiency. This system can be utilized to for but not limited to: screening, latency of response to a particular subject, type of accuracy, type of errors, task proficiency, working memory, subject strengths, subject weaknesses, educational grade levels, and intelligence of the user.

The present invention is also directed to the software process of the diagnosis and "coaching" of the student in general, but preferably in conjunction with the CONCENTRATION-type grid format of the game.

The system describes a game as a multi-media educational program or system which uses the grid of covered viewable CONCENTRATION type "windows" covered by "tiles" which are selectively opened to reveal chosen words for the student being taught.

The game opens with a screen allowing the teacher to bring up a word list for the child or adult subject. That list can be changed, saved or updated in response to the child's or adult's progress, which is mainly monitored by voice recognition software the capture the user subject's oral responses.

The system also provides that when a word is exposed, the subject must try and say the word. Wrong or partially correct attempts are monitored and saved for diagnostic purposes. If the child or adult user is non-responsive, the program will prompt the child with oral hints. The subjects memorize where prior answers were located, so that they can recall words previously revealed and re-hidden by subsequently closed windows.

While the present invention describes a grid with selectively openable windows, covered by opaque openable tiles, revealing words to be memorized, the present invention defines that when the subject makes a "guess" by opening a window he or she responds with an oral reading of the word or image shown.

The learning game system of the present invention further defines that if the answer is wrong, the voice recognition software of the present invention recognizes attempts by sound files and corrects the subject if the answer is wrong.

The learning game system of the present invention defines the option that the correct answer can be given in the subject's synthesized voice, as well as in a standard computer voice.

The learning game system of the present invention further provides that this interactive information provides a teacher with progress and diagnostic information, and analyses strengths and weaknesses of a student subject's progress over time. For example, the learning game system of the present invention provides that the present program can keep diagnostic information, such as latency of response, type of accuracy, types of errors and data relating to task proficiency.

The Learning game system of the present invention defines generally the flow charts, including their sub-loops, such as that the box "0.1" has a sideways arrow that goes to layer "1.1" on the next page, and then all the way back to "0.1" in layer "0". Likewise, "0.3" goes to "1.3" and back. Layer "2" extends off into layer "3" and back again.

Moreover, the learning game system of the present invention provides that much of the diagnostic information comes off of the box labeled "Check response with Voice Recognition Software", which further goes to a box labeled "Coaching" that involves interacting with the student subject.

The learning game system of the present invention also provides that the computer monitor displays the steps of the game, as well as the fact that the system may be programmed in a computer language such as JAVA SCRIPT and VISUAL SCRIPT. However, such computer code can be adapted and reconstituted over time.

The system is able to take on multiple forms such as the following examples. An individualized playing and learning system with coaching suitable for readers, beginning through $3^{rd}$ year (elementary/primary school) levels with:
 game objective: reveal a word matched by itself;
 learning objectives: sight recognition—read and say (challenging) words; word decoding—learn beginning sounds;
 stores and retrieves user-modified word files (on hard drive) by user-defined filename;
 print voice for all new words and beginning sounds recognizes voice "attempts" at word; delays play and prompts if no attempt;
 tutor/player can select duration of delay;
 recognizes "correct" word by voice with an * and colored font when also matched pair;
 stores correct reading of words (sound files);
 at end of game, reveals all words and reads them back in user's voice or other sensory perceptible feedback, or computer voice if necessary;
 on user command: shuffles word display; reveals all words in matrix; allows replay with or w/o changes in word list.

A system as described above also includes diagnostic tracking suitable for the same reader levels and objectives as above:
 additionally to provide teacher with progress and diagnostic information;
 requests identification of up to three students/players; keeps multiple files on all students, including all words ever used and all words learned;
 records latency of response on all words, for five games; prints data and summary after five games;
 analyzes probable strengths and persistent errors; places student on a literacy development continuum.

A system for individualized playing and learning with coaching suitable for readers, beginning above $3^{rd}$ year (elementary/primary school) levels also includes:
 game objective: reveal a word matched by a phrase;
 learning objectives: consolidate sight recognition and beginning sounds; improve vocabulary of (relevant) words; improve comprehension of (current) reading;
 otherwise the same as Version LB 1.0

The system described as above also includes diagnostic tracking suitable same reader levels and objects.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

I claim:

1. A computerized educational game system for teaching a user to identify items from a list of items of subject matter to be learned, comprising:
 a computer having a visual and audibly responsive display,
 said display comprising a matrix of separately openable covers revealing upon opening an item to be learned under each cover, the item and an equivalent match of the item appearing under two covers;
 means for a user to select a cover to be opened revealing an item;
 an audio input for said user to attempt to identify said revealed item into a computer readable file;
 a computer memory for storing in a hard drive and retrieving each item identified by said user, and sorting user responses by a user-defined filename;
 a speech recognition program to recognize attempts at identifying an item;
 said speech recognition program prompting said user with an audible clue if the user says nothing in response to the revealing of an item and audibly gives the answer if the user still does not respond;
 said computer recognizing a correct identifying of an item by said user with an indicia, and with a colored font when said user identifies the same item correctly under different covers;
 said computer storing correct reading of words in sound files; and
 at end of said game, said computer reveals all items and identifies them back in at least one of the user's voice and alternatively in a computer digitized voice.

2. A system as set forth in claim 1 wherein analysis of input by said user is computed to provide a teacher with progress and diagnostic information.

3. A system as set forth in claim 2 wherein multiple users may utilize the system at the same time.

4. A system as set forth in claim 3 wherein analysis of probable strengths and persistent errors of the user is conducted to place the user on a learning development continuum.

5. A system as set forth in claim 1 wherein an item to be learned is matched by a phrase.

6. A system as set forth in claim 1 wherein an item to be learned is matched by a picture.

7. A system as set forth in claim 1 wherein an item to be learned is matched by an audible sound.

8. A system as in claim 1 further comprising on a user command, said computer automatically shuffling an item display to avoid revealing all previously located items in said matrix; said system further allowing replay with or without changes in said item list.

9. A system as in claim 1 wherein said list of items to be identified is a list of words to be read.

10. A system as in claim 1 wherein said equivalent match of the item is the same item.

11. A computerized educational game system for teaching words from a word list comprising:
- a computer having a visual and audibly responsive display,
- said display showing a matrix of blank covers, each cover revealing upon opening a word, each word appearing under two covers;
- means for a user to select a cover to be opened revealing a word;
- an audio input for said user to read the revealed word into a file;
- a speech recognition program for evaluating the word read by said user and comparing the word read by said user with the revealed word;
- said computer displaying an indicia to recognize a correct reading of the word read;
- said speech recognition program prompting said user with an audible clue if the user says nothing in response to the revealing of a word and audibly gives the answer if the user still does not respond to the audible clue; and
- said computer storing reading of words in sound files; wherein at end of a game, said computer reveals all words and reads them back.

12. A computerized educational game system for teaching items to be learned from an item list comprising:
- a computer having a visual and audibly responsive display,
- said display showing a matrix of blank covers, a cover revealing upon opening an item to be learned, another cover revealing an equivalent match for the item to be learned;
- means for a user to select a cover to be opened revealing an item;
- a speech recognition program for evaluating the item read by said user and comparing the item identified by said user with the revealed item to be learned;
- said computer displaying an indicia to recognize a correct reading of the item identified;
- said speech recognition program prompting said user with an audible clue if the user says nothing in response to the revealing of an item and audibly gives the answer if the user still does not respond to the audible clue; and
- said computer storing identifying of items in sound files; wherein at end of a game, said computer reveals all items and identifies them back.

\* \* \* \* \*